United States Patent [19]

Mott et al.

[11] Patent Number: 4,519,725

[45] Date of Patent: May 28, 1985

[54] OFFSHORE STRUCTURE INCORPORATING A CONDUCTOR DEFLECTING SYSTEM

[75] Inventors: George E. Mott, Metairie; Frederick J. Levert, Jr., Chalmette, both of La.

[73] Assignee: Texaco Inc., White Plains, N.Y.

[21] Appl. No.: 506,734

[22] Filed: Jun. 22, 1983

[51] Int. Cl.³ .................. E02B 17/00; E21B 43/01
[52] U.S. Cl. .................................... 405/195; 405/169
[58] Field of Search ............... 405/169, 195, 224, 227; 166/341, 345, 347, 367

[56] References Cited

U.S. PATENT DOCUMENTS

| | | | |
|---|---|---|---|
| 3,434,296 | 3/1969 | Otteman et al. | 405/169 X |
| 3,546,889 | 12/1970 | Hemphill et al. | 405/169 X |
| 3,685,300 | 8/1972 | Mott | 405/227 |
| 4,023,371 | 5/1977 | Bryant | 405/169 |

FOREIGN PATENT DOCUMENTS 473851 2/1974 Australia ........................... 405/227

Primary Examiner—David H. Corbin
Attorney, Agent, or Firm—Robert A. Kulason; Robert B. Burns

[57] ABSTRACT

An offshore structure that is supported above the water's surface by at least one substantially vertically disposed leg which extends to the ocean floor. The structure is adapted to accommodate a vertical member or riser conductor having a deflector segment capable of engaging one or more fluid carrying conduits or risers which are lowered therethrough. The deflector segment is positioned to engage a lowering riser end so that the riser will be urged outwardly and away from the base of the structure. The riser or risers can thus be readily connected to subsea pipelines which terminate adjacent to the foot of the offshore structure.

6 Claims, 5 Drawing Figures

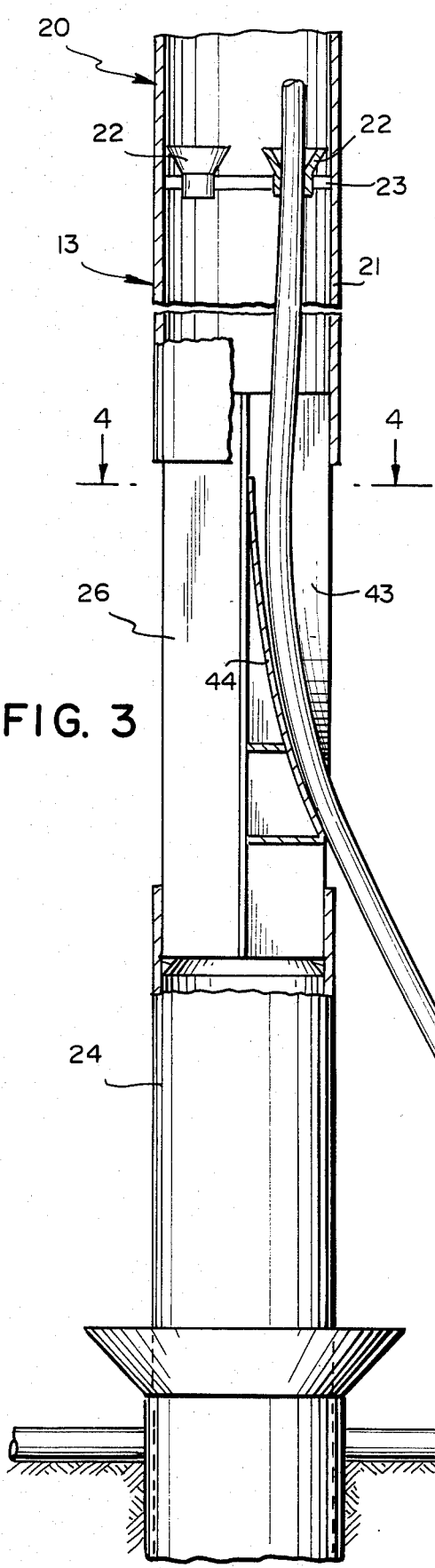
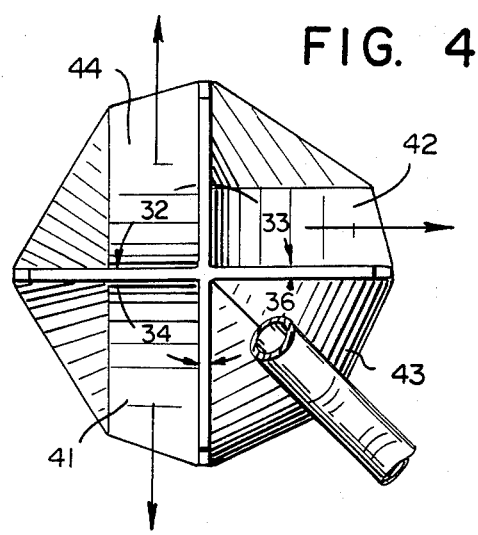
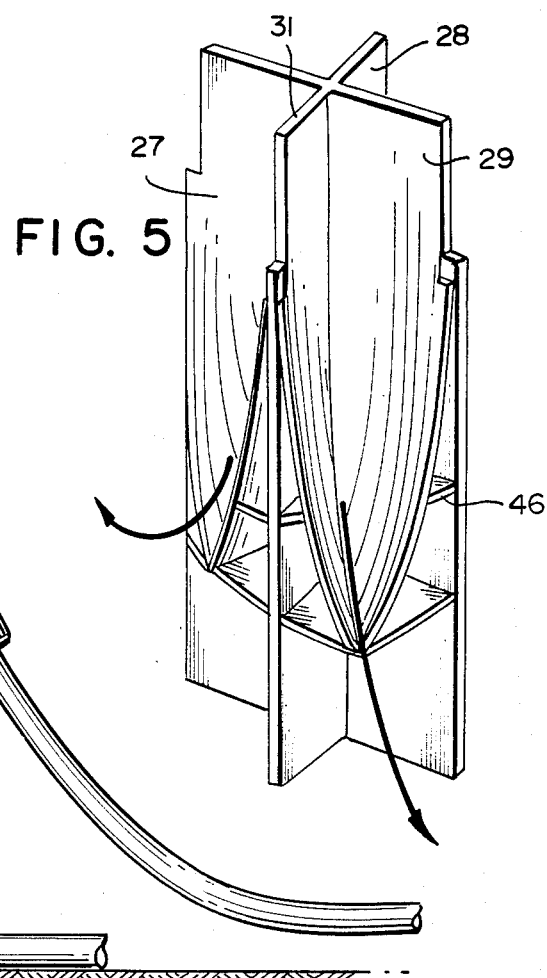

OFFSHORE STRUCTURE INCORPORATING A CONDUCTOR DEFLECTING SYSTEM

BACKGROUND OF THE INVENTION

Platforms and structures which are used for offshore work in varying depths of water find utility for a number of purposes. Often such platforms are utilized to support equipment and like material for drilling offshore wells to produce gas and/or crude oil.

Because the platforms are so expensive, particularly for use in deep water, they are often used as gathering centers for a plurality of remote or dispersed wells in addition to on-platform wells. Thus, while a particular offshore reservoir might embody any number of producing wells, the production flow from the remote wells can be carried through subsea pipelines to a single desired gathering point.

Platforms or structures of the type presently contemplated are utilized to gather the crude product, whether it be gas or oil, into a central treating area. From there it can be transshipped by way of vessels or other means, or merely pumped to a central station onshore for further processing.

Since the product carrying pipelines are disposed at the ocean floor, it is necessary that they be led from the remote well head to the foot of the offshore structure. From there the pipeline is connected to a suitable extension of the pipeline or riser so that the product can be either pumped or forced by its own pressure upwardly through the riser to the deck of the platform.

Platforms of this type are normally provided with a working deck which is supported above the water's surface by at least one, and preferably by a number of heavy support legs. The latter serve not only to position the platform firmly at the offshore site but also provide support and protection to the plurality of on-platform well conductors and the risers which normally extend from one or more pipelines up to the deck.

During the fabricating step of an offshore platform, normally the required complement of well conductor guides and risers are preplaced within the structure so that they are an integral part thereof when the platform is installed at the offshore site. However, often the number of risers which are initially built into the structure is insufficient to accommodate the number of remote or dispersed wells that have later been discovered and found to be productive. It therefore may become necessary at a future date to install additional risers for pipelines to be gathered into the foot of the structure.

When adding risers not previously planned for, it is necessary to safeguard them against damage which might be caused by water forces or floating objects such as debris, ice and the like. It is also necessary to minimize the weight and size of the added risers and their attachments and supports.

In such an instance, the riser can be made as a heavy walled self-protective member. However, this would not minimize weight and size. It is considered more practical to pass one or more risers directly through an existing or added vertical protective member. In platforms with on-platform wells, guides are preinstalled in the structure during fabrication to protect and stabilize the on-platform well conductors. Usually, extra conductor slots are provided beyond the minimum required.

In platforms where an extra conductor slot or slots are available and additional pipeline risers are required, the addition of the protective vertical member into the existing unused conductor slot and guides will be most practical. If no conductor slots remain unused, the addition of the protective vertical member with necessary supports may be accomplished in a manner somewhat similar to the on-platform well conductors.

In the presently disclosed arrangement, there is disclosed an addition to an offshore structure or platform of the type contemplated. The addition being that, an upright protective member is provided which is vertically and horizontally self-supporting and permitting insertion of a number of fluid carrying risers therethrough as needed. If placed in an existing well conductor slot, no modifications to the platform structure are required and no increase in original design loadings or weight added to the deck is created.

The upright member is thus provided with upper and lower spaced apart segments which are connected by an intermediate connecting element disposed therebetween. Said upright member extends to and into the ocean floor. It is, most essentially, capable of permitting a number of risers to be lowered therethrough and which are deflected outwardly in a desired direction or directions. Further, it protects the risers and supports the riser weight.

It is therefore an object of the invention to provide a modification to an offshore structure by the provision of a unique riser support structure. A further object is to provide a structure of the type contemplated that is initially fabricated in a manner to be readily adapted in the future by the addition of further fluid carrying risers after the unit has been installed at an offshore site. A still further object is to provide an offshore structure that is provided with means to receive fluid carrying risers longitudinally therethrough in a manner that the risers will be bent or deflected away from their normal downward course during installation.

DESCRIPTION OF THE DRAWINGS

FIG. 3 is a segmentary view on an enlarged scale of a part of the vertical member or riser conductor shown in FIG. 1.

FIG. 4 is a cross-sectional view of a portion of the riser conductor shown in FIG. 3.

FIG. 5 is a segmentary view of a section of the vertical member shown in FIG. 3.

Figure 1:
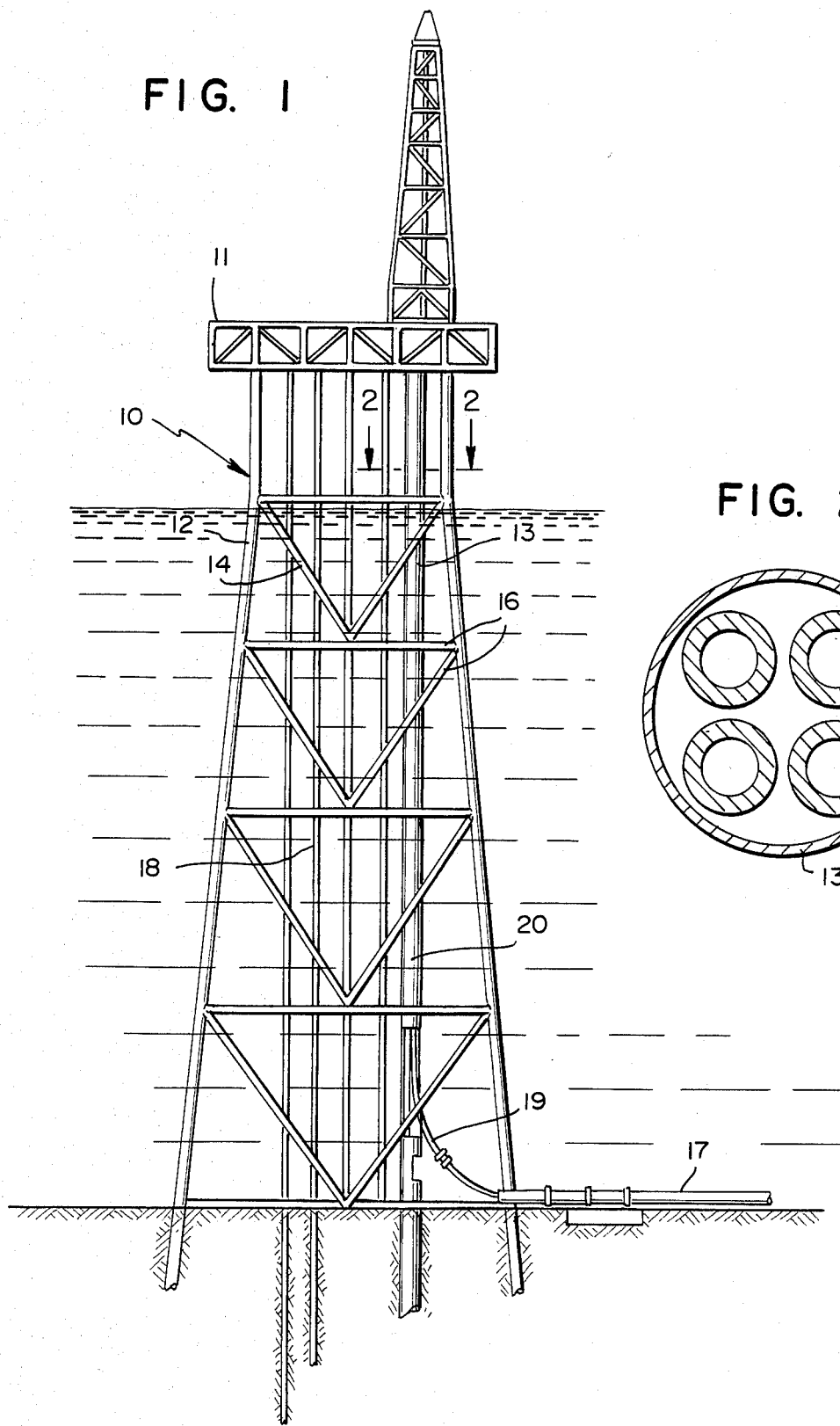
FIG. 1 is an elevation view of an offshore structure of the type contemplated.
Figure 2:
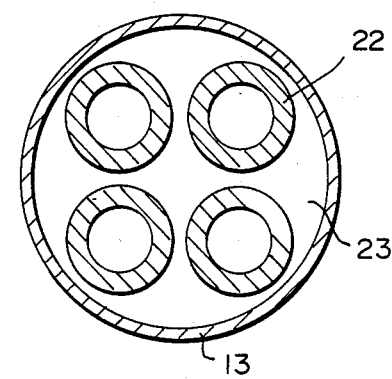
FIG. 2 is a cross-sectional view taken along line 2—2 of FIG. 1.

In achieving the above noted objectives, there is disclosed an offshore platform 10 as shown in FIG. 1, which is positioned in a body of water. The platform is comprised primarily of deck 11 which is maintained above the water's surface, and which holds equipment normally utilized in drilling for offshore wells and for receiving flows of produced fluids. While not presently shown, deck 11 would normally hold a number of storage tanks and similar equipment capable of processing hydrocarbon fluids such as gas and crude oil which are piped from remote wells.

Deck 11 is supported in its elevated position above the water by at least one, and preferably by a plurality of elongated legs 12 and 13. The latter are normally constructed of relatively heavy walled steel, and in sufficient numbers to safely support the deck.

The respective legs 12 and 13 are provided with the necessary cross bracing 14 and 16 to strengthen the structure as a whole and to assure its integrity for resisting the severe conditions normally experienced at an offshore site where the unit is installed.

In the instance of a fluid gathering unit, platform 10 is preferably located at a central or gathering point for a number of pipelines 17. The latter are brought to the structure from remotely positioned wells. Often, such wells are disposed at the ocean floor and flow both gas and crude oil that is produced, through a well head, and which flows through pipeline 17.

At the platform, pipeline 17 is connected to a conductor or riser 18, which extends upwardly to deck 11 and terminates at tanks or other processing facilities.

The normal form of conductor or riser 18, utilized for directing fluids to deck 11, is fabricated of steel. As shown in FIG. 1, a plurality of the conductors and risers 18 are initially installed in the structure either for carrying fluids or for directing a drill string into the substrate. However, illustrative of the instant invention, the elongated upright riser conductor 20 is positioned in a manner that it can be provided with one or more subsequently installed risers.

Referring to FIG. 3, the riser conductor 20 is comprised of an upper guide segment 21 which extends upwardly to engage deck 11. This guide section may optionally include a plurality of longitudinally spaced, conical guides 22, which are fixed in a desired pattern within guide plate 23.

A series of optional guide plates 23 are spaced sufficiently apart within riser conductor 20 to permit a subsequently inserted riser 19 to be lowered from deck 11, and to be held and in substantially vertical alignment.

The lower end of the riser conductor 20 is comprised of lower segment 24. The two segments 21 and 24 are connected and maintained in axial alignment by an intermediate member 26.

Referring to FIGS. 4 and 5, said intermediate member 26 in one embodiment includes a plurality of upstanding gusset plates 27, 28, 29 and 31. The latter are joined by welding along a common edge, to define an elongated cruciform cross-section. This drawing embodiment illustrates an example of a four chamber cross-section. Other multi-chamber cross-sections are also applicable to the structure as required by the number of risers to be inserted.

Although the particular configuration of intermediate member 26 can be varied, it must of necessity be structurally adequate to function as an integral part of the riser conductor. Thus, the thickness and grade of steel of plates 27, 28, 29 and 31 constitutes primarily a design function.

As seen in FIG. 4, the respective upright gusset plates of member 26 form longitudinal, radial segments 32, 33, 34 and 36 therebetween. Preferably said segments will divide member 26 into discrete peripheral compartments for receiving one or more downwardly lowering risers such as 19.

Member 26 is rigidly fastened by welding, grouting or bolting into the adjacent spaced apart end openings of respective aligned sections 21 and 24. The degree of overlapping of the circular segments 21 and 24 with a cooperating portion of member 26, will be sufficient to assure that said member 26 is capable of supporting the subsequently inserted conduits 19.

As shown in FIGS. 4 and 5, member 26 is provided with means for intercepting and deflecting a downwardly moving riser 19. Said means includes at least one, and if need be, a plurality of deflector plates or shoes 41, 42, 43 and 44. The latter are arranged longitudinally along one or more of the peripheral compartments in said member.

Each deflector plate or shoe combination such as 41 or 44, is disposed beneath, and in substantial alignment with a conical guide piece 22. Thus, as riser 19 is lowered from deck 11, it will register in the series of vertically aligned conical pieces 22. The conductor will then be guided such that further descent will cause its lower end to eventually engage the deflector plate therebeneath.

In another embodiment, the shoe or plate, when only one is utilized such as 42, is generally elongated and may incorporate a gradual curvature. At its upper end, plate 42 is disposed adjacent to gusset 28 at a point spaced downwardly from the plate top surface. Plate 42 is further disposed with one longitudinal edge contiguous to the edge surface of gusset plate 29. Thus, as a lowering riser 19 engages the deflecting surface of shoe 42, the riser will be restrained from outward movement by conical piece 22, but will be urged outwardly as shown in FIG. 3. The opposing forces acting on the riser will deflect the lower end thereof away from the riser conductor at a point above the mud line adjacent to the structure 10.

In an alternate embodiment of the riser deflector arrangement, a plurality of, or combination of shoes 43 and 45 are disposed within one longitudinal sector 36 of member 26 to form a trough-like path for riser 19. Thus, as the latter is lowered past conical guide piece 22, the riser end will engage the junction of the contiguous shoes 43 and 45 and thereby be maintained in relatively accurate alignment. Thereafter, as it is further lowered, its end will be urged outwardly and terminate at a desired point to permit said riser end to be connected to a pipeline 17.

It is appreciated that the disposition of guide member 26, together with its various conductor deflecting shoes, is such as to give the subsequently inserted riser 19 a desired arrangement or disposition adjacent to the mud line. The respective shoes, such as 41, are thus prearranged within said member 26 so that the risers, if subsequently lowered, will assume a position compatible with contemplated incoming pipelines 17.

By varying the angles of deflection and the disposition of the various shoes 41, the risers 19 can be made to deflect in predetermined directions to assure they will leave the platform in a desired direction.

The respective shoes, such as 42 and 43, as shown in FIG. 5 can be braced against distortion by braces 46 disposed rearwardly thereof and spaced to support the deflecting unit.

Although modifications and variations of the invention can be made without departing from the spirit and scope thereof, only such limitations should be imposed as are indicated in the appended claims.

We claim:

1. In an offshore structure 10 for operating from an embedded position in a body of water to treat hydrocarbon fluids which are received from underwater pipelines, which structure includes; a deck holding hydrocarbon treating equipment, and at least one leg which extends between the floor of said body of water to the deck whereby to elevate the latter beyond the water's surface, the improvement therein of;

a multi-segment riser conductor means 20 depending from said structure embedded in the said floor, and including a plurality of riser guides 22 enclosed therein and vertically arranged to slidably register a downwardly moving riser 19, in a substantially vertical dispostion, and a riser deflector 26 forming an integral part of said riser conductor means and defining a plurality of multi-directional lateral openings for diverting risers outwardly from within the riser conductor means, and being spaced beneath said plurality of riser guides 22 and above said floor, whereby to engage the lower end of a downwardly moving riser 19 and to whereby urge the said lower end away from said vertical disposition, through a wall of said riser conductor and onto the said floor as the riser is progressively lowered.

2. In an apparatus as defined in claim 1, wherein said multi-segment riser conductor means 20 includes; an upper tubular guide segment 13 and a lower tubular guide segment 24 which are vertically spaced apart, and said riser deflector 26 being engaged with and positioning said upper segment and lower segments respectively into substantial axial alignment.

3. In an apparatus as defined in claim 2, wherein said riser deflector 26 includes; at least two uprightly aligned gussets which are mutually interconnected along the central axis of said riser conductor to form a rigid body which engages said upper and lower segments, and which defines discrete longitudinal sectors to receive a downwardly lowering riser, whereby to direct the latter onto the said floor adjacent to said riser conductor.

4. In an apparatus as defined in claim 3, wherein said riser deflector 26 includes; at least one elongated deflector plate 44 disposed in angular relation to the longitudinal axis of said riser deflector, the elongated deflector plate having an upper end thereof positioned adjacent to the riser conductor central axis, and the plate lower end being spaced radially away from said central axis whereby said upper end of said deflector plate 44 will slidably engage a downwardly moving riser and urge the latter radially outward from the said central axis and toward said floor.

5. In an apparatus as defined in claim 3, wherein said riser deflector 26 includes; a pair of elongated members being cooperatively arranged to define discerete guide trough, and to divert said risers in different outward directions.

6. In an apparatus as defined in claim 3, wherein said at least two uprightly aligned gussets define at least two discrete longitudinally extending sectors therebetween.

* * * * *